United States Patent [19]

Barbulescu et al.

[11] 4,245,431
[45] Jan. 20, 1981

[54] APPARATUS FOR MAKING SEEDLING TUBES

[75] Inventors: Adrian Barbulescu, Ste-Foy; Rodrique Boulet, Duberger; Jean-Paul Charland, Charlesbourg; Paul Fortin, Loretteville, all of Canada

[73] Assignee: Centre de Recherche Industrielle du Quebec, Sainte-Foy, Canada

[21] Appl. No.: 71,569

[22] Filed: Aug. 31, 1979

[30] Foreign Application Priority Data

May 30, 1979 [CA] Canada ........................... 328724

[51] Int. Cl.³ .............................. B65B 1/00
[52] U.S. Cl. ........................... 47/1 A; 47/74; 47/77
[58] Field of Search ........................ 47/1 A, 63–64, 47/74, 77, 86, 56; 111/2–3

[56] References Cited

U.S. PATENT DOCUMENTS

| 3,080,680 | 3/1963 | Reynolds et al. | 47/74 |
| 3,788,003 | 1/1974 | Creighton et al. | 47/77 X |
| 4,020,881 | 5/1977 | Nothen | 47/1 A X |

FOREIGN PATENT DOCUMENTS

| 837402 | 3/1970 | Canada | 47/77 |
| 1000182 | 11/1976 | Canada | 47/77 |
| 421321 | 9/1974 | U.S.S.R. | 47/74 |

Primary Examiner—Robert E. Bagwill
Attorney, Agent, or Firm—Cushman, Darby & Cushman

[57] ABSTRACT

The apparatus comprises a delumper-sifter and a mixer used to prepare a mixture of peat and water which is placed in storage; the mixture is then passed to a forming device, is extruded in the form of continuous cylinder and is covered with a sheet of degradable paper; the covered product is cut up by means of a rotating spiral cutter, the rotational speed of which is synchronized with the speed at which the mixture emerges from the forming device, thus making it possible to obtain cylindrical extrusions of a predetermined length; the cut extrusions pass to a conveyor-distributor which arranges them in rows and then allows them to fall, in a vertical position, onto a supporting conveyor above which a drum, equipped with cylindrical protuberances, produces in the extrusions cavities in which seeds are subsequently placed and covered with sand; the final operation carried out by the apparatus is to group the seedling tubes thus produced and to wrap them in packages.

16 Claims, 10 Drawing Figures

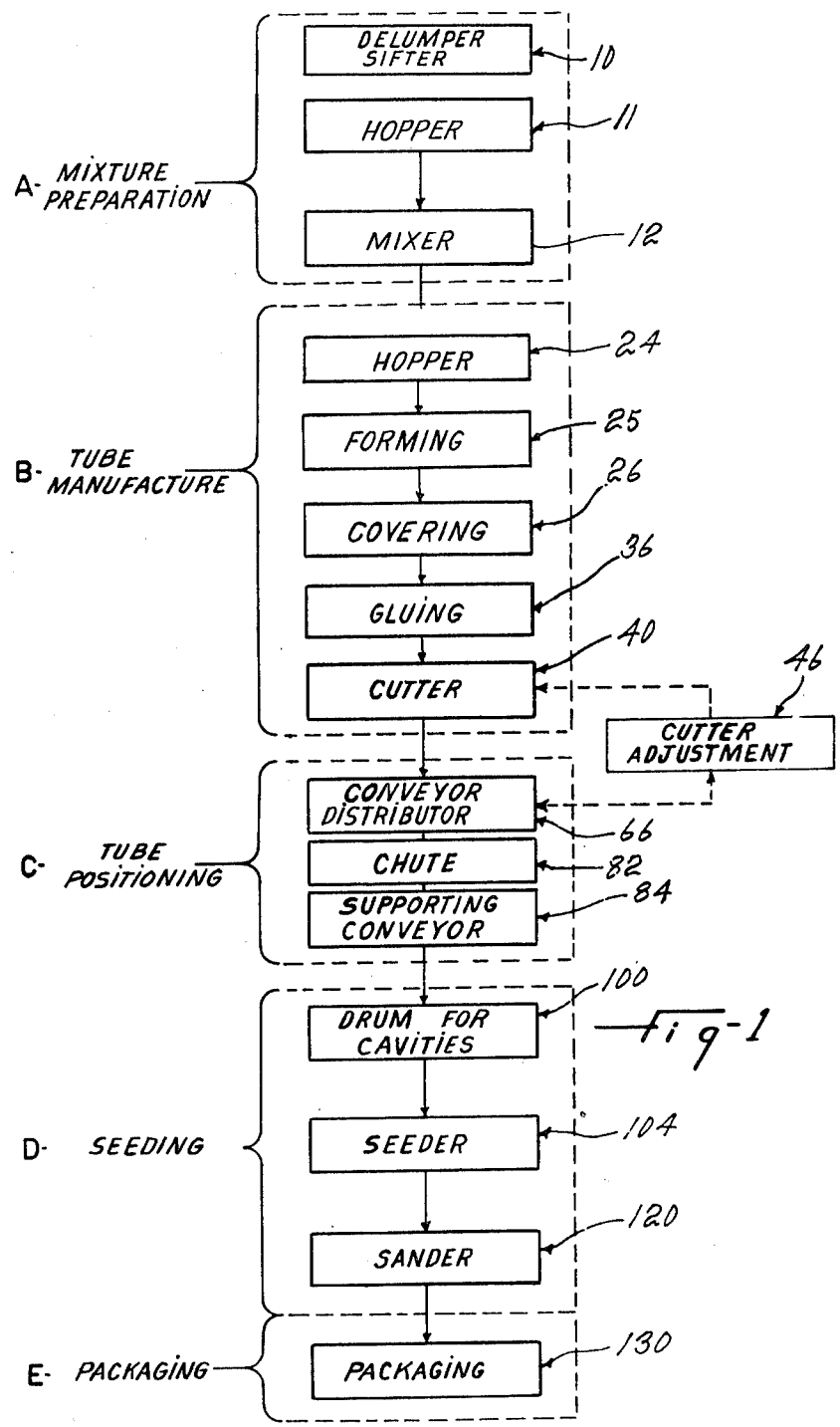

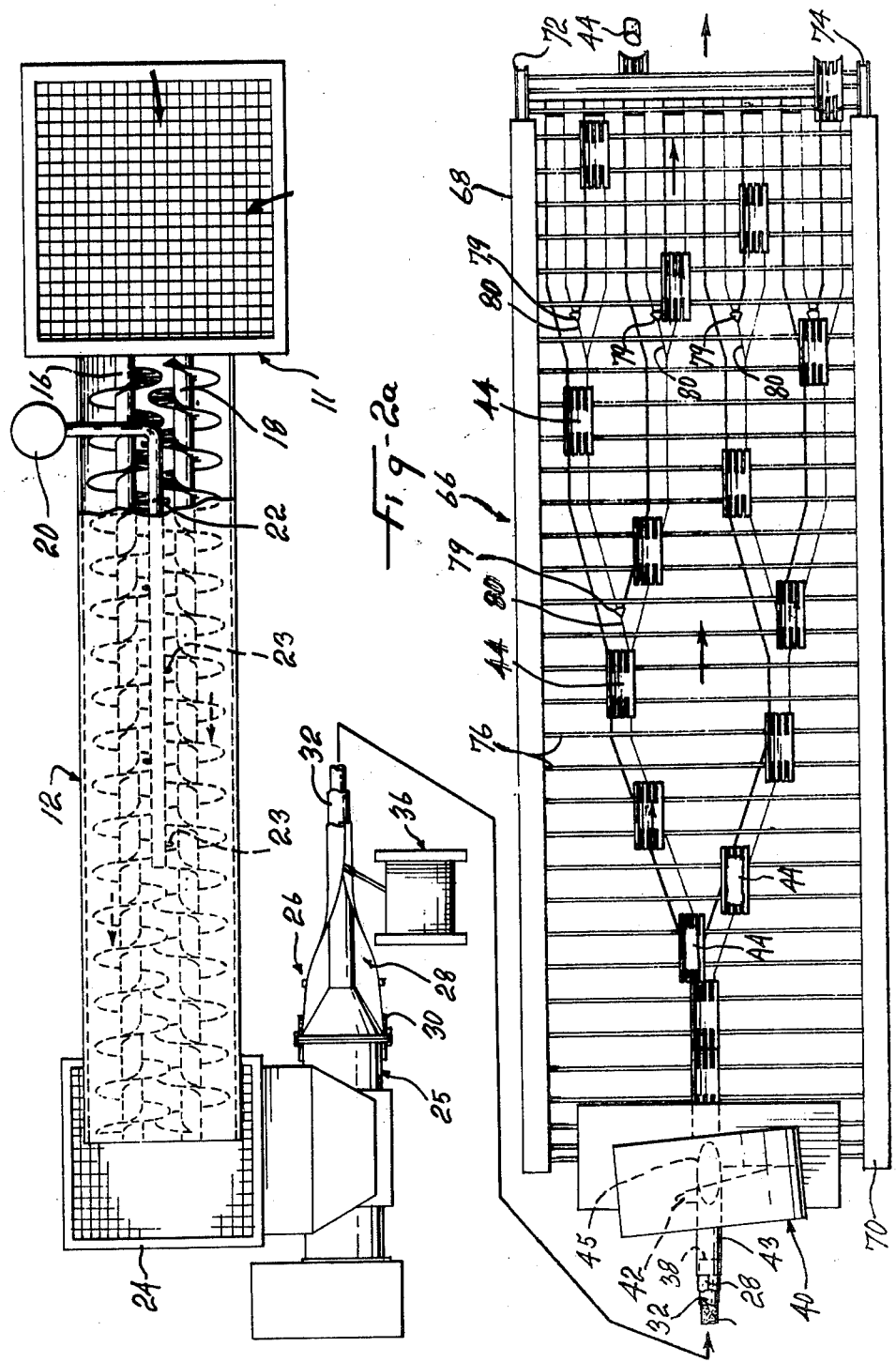

4,245,431

APPARATUS FOR MAKING SEEDLING TUBES

FIELD OF THE INVENTION

The present invention relates to an apparatus used to produce packaged tubes of peat in which seeds are placed for the purpose of growing plants, or seedlings used mainly for horticultural or forestry purposes.

BACKGROUND OF THE INVENTION

One method of producing peat tubes is described in Canadian Pat. No. 939,905 issued on Jan. 15th, 1974 to the Research Council of Alberta, wherein a mass of peat, having the consistency of a purée, is compressed for the purpose of filling, through a nozzle, a thin plastic tube between 6 and 8 m in length. This tube, which may be between 2.5 and 3.3 cm in diameter, is then cut into lengths varying between 7.5 and 12.5 cm which are then arranged side-by-side in boxes. Once arranged vertically in the boxes, the cylinders, which are open at both ends, are treated as usual, i.e. they are hand-seeded, covered, and placed in greenhouses or in open ground, to promote germination and development of the seedlings. At the time of planting, the wall surrounding the cylinder should be removed and the seedling placed in the ground with the root-hairs left free.

Canadian Pat. No. 1,000,182, issued in November 1976 to Carlos Enrich, describes an apparatus and a method for producing seedlings. The apparatus described in this patent uses a tube made from a sheet of polyethylene and filled continuously, thus producing a continuous sausage. Although it is mentioned in this patent that the peat mixture is subsequently cut into small pieces, no teaching is provided as to the method of cutting and seeding the tube. It is to be assumed that cutting and seeding are separate manual operations carried out on a stationary tube.

OBJECTS AND STATEMENT OF THE INVENTION

It is an object of this invention to set up a fully automatic line for the production of seedling tubes from a hopper in which the peat is stored until the packaging operation where the tubes are placed in boxes, thus reducing the number of workers required to produce the finished seedling.

In its broadest sense, therefore, the apparatus according to the invention comprises: a mixer used to prepare the mixture of peat and water; forming means receiving this mixture and producing a continuous cylinder moving at a constant speed; means for covering the continuous cylinder as it emerges from said forming means; and a rotary cutter with a spiral blade to cut the continuous covered cylinder progressively into cylinders of predetermined length, the rotational velocity of the cutter being constant to obtain cylinders of constant length.

According to one preferred form of the invention, a conveyor-distributor picks up the cylinders at the outlet from the cutter and passes them to a device which arranges them vertically, in rows, on a supporting conveyor, for the purpose of seeding them.

According to another design, the seeding means comprises a rotating drum equipped with protuberances which form cavities in the upper part of the cylinders, a means for placing a specific number of seeds in each of the cavities, and a sander which places a certain quantity of sand on top of the seed-containing cavities.

According to still another form, the cut cylinders are packaged in groups which are supported by plates and are thus ready to be boxed for shipment.

Other characteristics and advantages of the invention may be gathered from the following description of a plurality of embodiments of the apparatus used to produce seedling tubes, in conjunction with the drawings attached hereto:

BRIEF DESCRIPTION OF THE DRAWINGS

FIG. 1 is a diagram showing the different stages along the automatic line for continuous production of seedling tubes of peat according to the present invention;

FIGS. 2a and 2b illustrate, on separate sheets, the various components of the apparatus according to the invention;

DESCRIPTION OF PREFERRED EMBODIMENTS

Figure 2B:
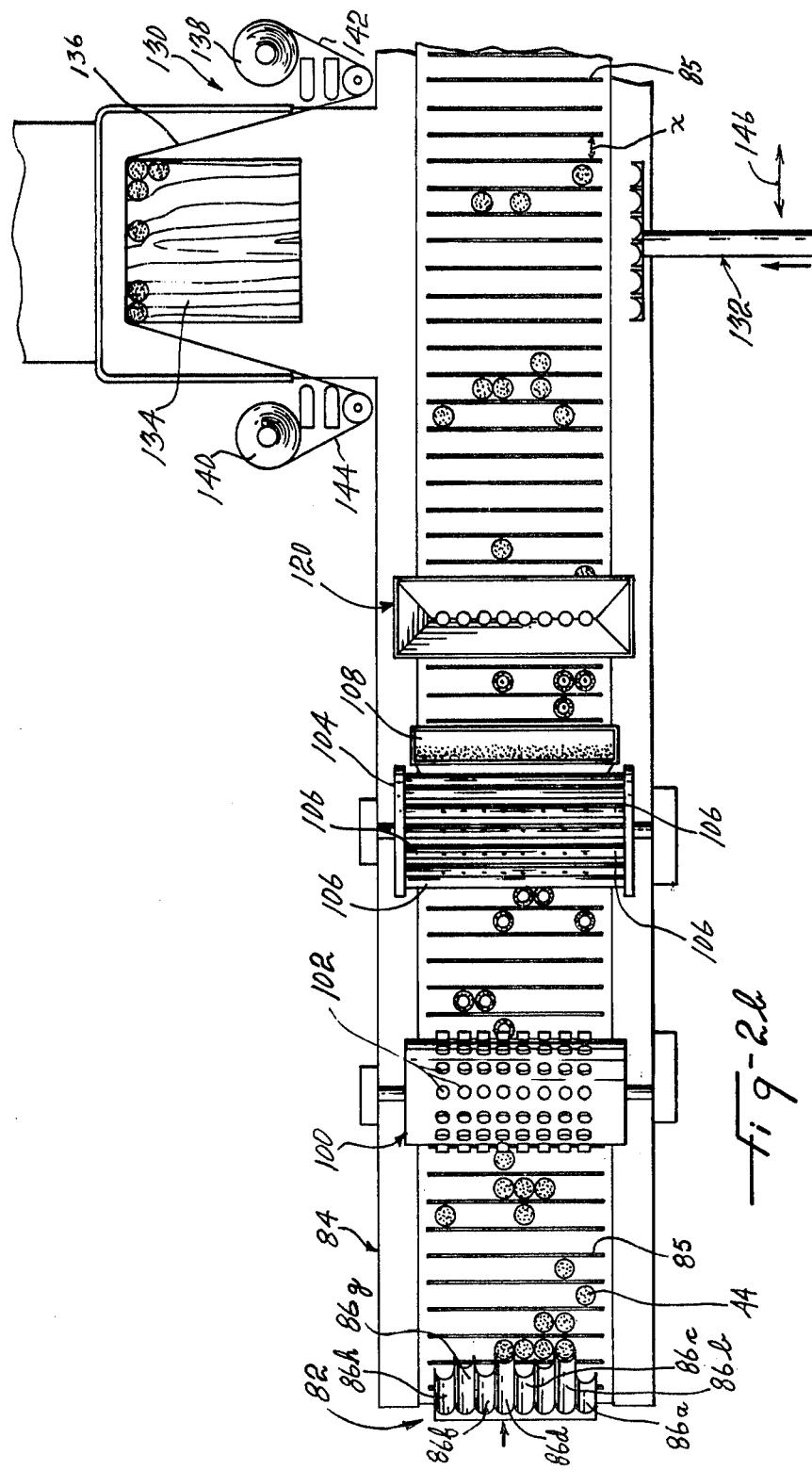
Figure 3:
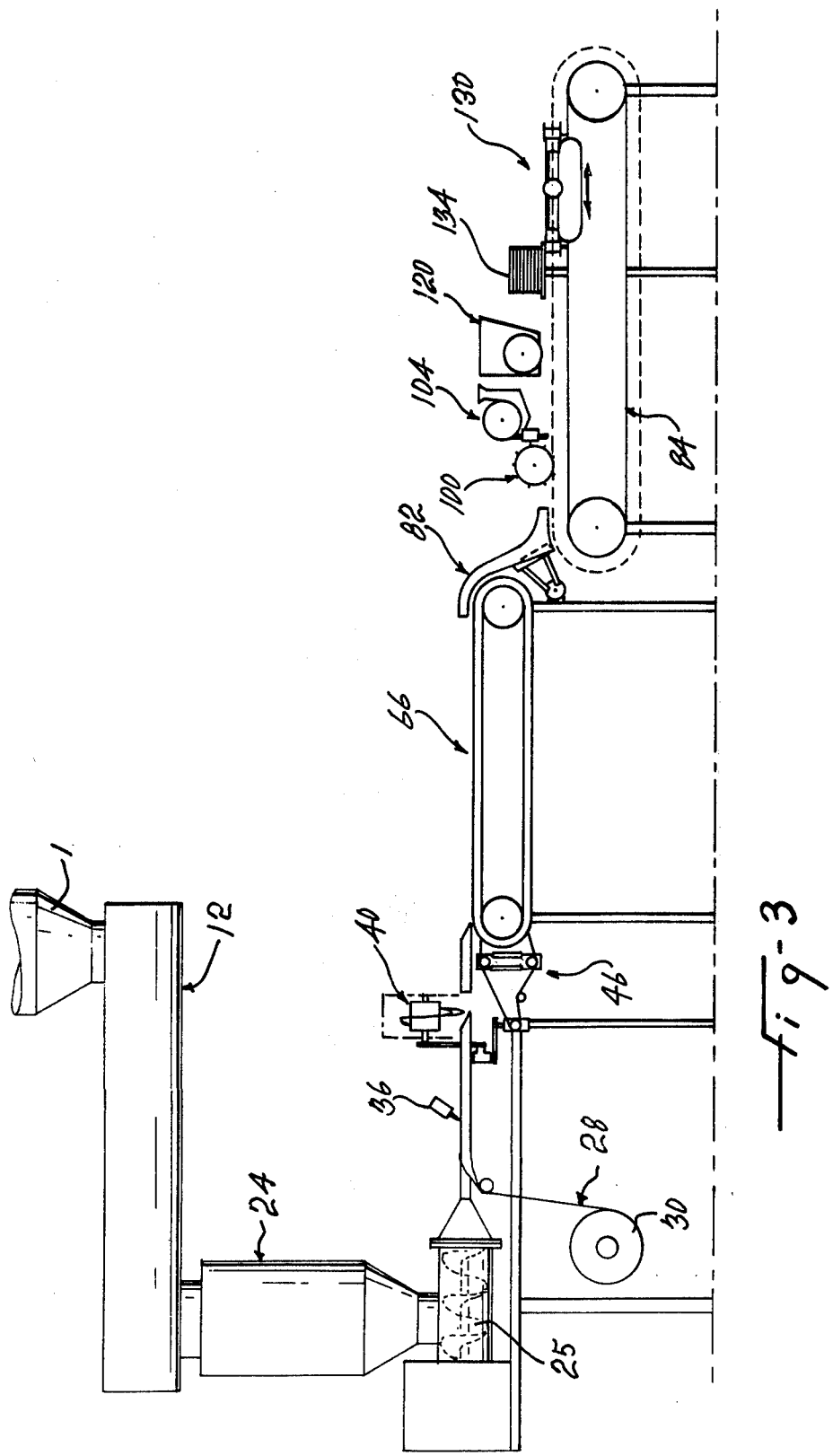
FIG. 3 is a diagrammatic side elevation of the system of the present invention, with the hopper omitted.

FIGS. 1, 2a, 2b and 3 illustrate, in general, the various components of an automatic system designed to produce seedlings from the moment when the mixture used to contain the seed for the seedlings is stored, to the moment when the formed seedling tubes are packaged and ready for shipment; these figures will be referred to as and when the various components of the present invention are described.

The system comprises in the first stage a delumper-sifter 10 (not shown in FIG. 2a) used to loosen up agglomerations and separate foreign bodies, and a hopper 11 which accepts the peat for the mixture used to contain the seed for the seedling; this hopper may be provided with means to facilitate the discharge of the peat. A feed-means (not shown in FIG. 2a), located below hopper 11, passes the peat to a mixer 12 comprising two shafts, with adjustable vanes 16, 18, which mixes the peat with water supplied through a main conduit 20 and discharged through a second conduit 22 equipped with sprinklers 23. The peat is metered in correct proportions to produce a homogeneous substance ready for the forming process described hereinafter. The delumper-sifter, hopper and mixer are commercial units which should be selected with care to match the system requirements. The peat, thus prepared, is stored in a hopper 24, from which it passes to forming means, for example, to an extruder 25, comprising helicoidal worms with unequal pitch and diameter and arranged in series in such a manner as to impart to the extruded peat a continuous cylindrical shape having the desired characteristics.

A mechanism 26, associated with the forming means 25, covers the continuous peat cylinder with a sheet of degradable paper supplied from a roll 30. The covering unit comprises a metal tube 32, associated with the extruder, around which paper 28 is placed in order to shape it. A bead of glue is applied, with the aid of a commercial gluing unit 36 and a heating element 34, to one end of the sheet, in order to seal it and thus form a tube; in the case of certain materials, the same result may be obtained merely by using a heating element (not shown).

At outlet 38 from metal tube 32, a continuous mixture of peat and water is covered with the tube of paper, thus forming a continuous covered cylinder moving along the axis of the apparatus at a predetermined constant speed. However, this speed must be capable of adjustment, so that it is possible to control the consistency of the extruded peat cylinder. Although not shown in the drawings, a device for adjusting the feed velocity of the extruder may be used downstream of the gluing unit; this device would comprise a closed-loop mechanical brain having a pick-up in the form of a wheel bearing upon the cylinder of moist peat; any sinking of the wheel into the cylinder would pass an appropriate corrective signal to the extruder feed means.

Figure 4:
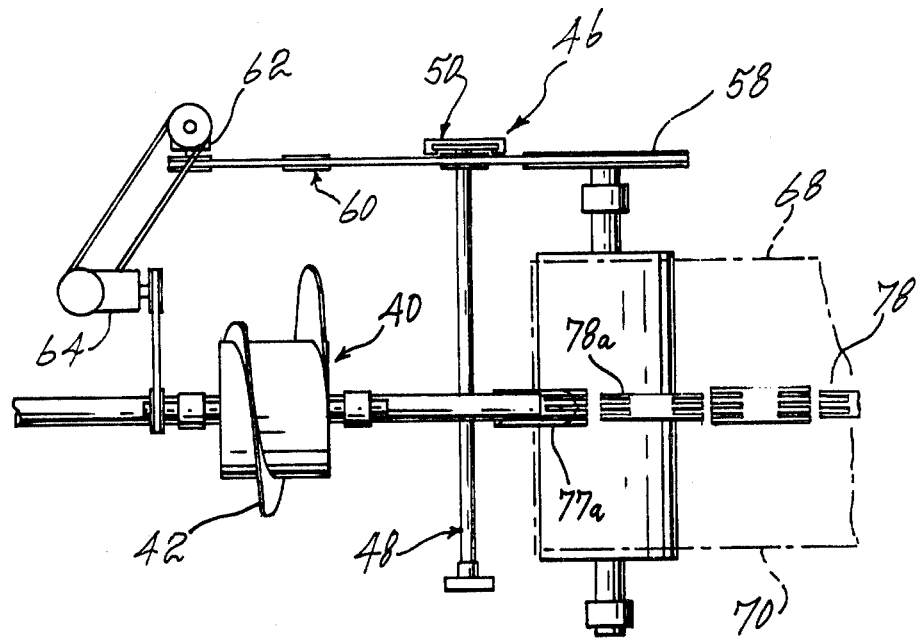
FIGS. 4 and 5 illustrate, respectively, a plan view and a side elevation of a portion of the system in the vicinity of the cutter.
Figure 5:
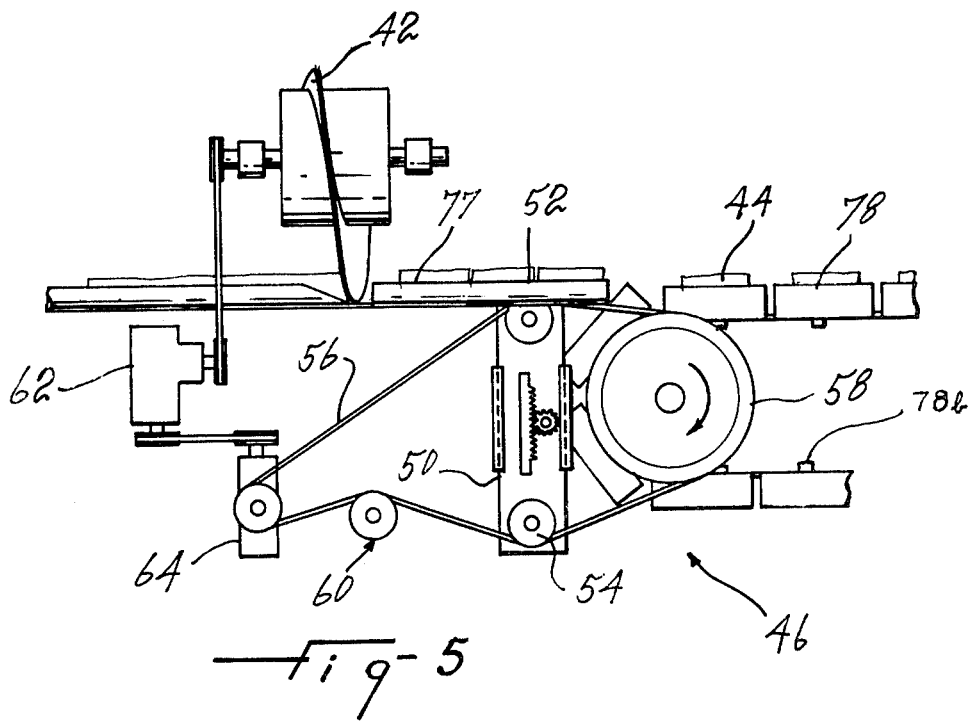

As shown in FIGS. 4 and 5, a rotary cutter 40, comprising a spiral blade 42, is used to cut the continuous peat cylinder into a series of lengths 44. The radius of rotation of the cutting edge of the blade varies within a revolution in order that the blade may penetrate progressively into the peat cylinder. The progressive cut also travels along the longitudinal axis of the apparatus or in the direction of travel of the cylinders. Inlet tube 43, through which the covered cylinder of peat passes to the cutter, thus has a surface cut at an angle and defining an oval 45 in FIG. 2a.

As soon as they have been cut, cylinders 44 pass to a conveyor-distributor 66 carrying a series of concave semi-cylindrical supports 78 which successively receive the cylinders in single file along the centreline of the conveyor-distributor. A mechanism 46 adjusts the feed of cylinders 44, at the outlet from the cutter on supports 78. From FIGS. 3, 4 and 5, it will be seen that this mechanism comprises a handle 48 which is rotated to the left or right and thus shifts sliding plate 50, carrying two sprockets 52, 54, either upwards or downwards, which makes the chain 56 advance or recede in relation to main sprocket 58. This transmission system also comprises a tensioning means 60 and two gearboxes 62, 64.

Conveyor-distributor 66 consists of two parallel chains 68,70 running on sprockets at each end, two of which 72,74 are shown in FIG. 2a. The chains are united by rods 76 arranged at right angles to the direction of travel of the conveyor-distributor. Secured to each pair of rods is a support 78 adapted to slide laterally along the rods, thus allowing the supports to assume different transverse positions on the conveyor-distributor. Each support moves along the centreline of the conveyor-distributor, downstream of semi-cylindrical feed-tube 77 which is located immediately after cutter 40. Supports 78, and the end of tube 77, are of a design such as to facilitate the transfer of cylinders 44 from one to the other. Thus, the downstream end of semi-cylindrical tube 77 comprises slots 77 for the passage of fingers 78 of the supports. The lower part of each support comprises an element 78b which, as it moves on the conveyor-distributor, encounters and actuates a cam 79 which pivots in one direction or the other and thus actuates a gate 80 which, after it moves, will guide the supports along an adjacent parallel path. FIG. 2a shows a few peat cylinders lying horizontally upon supports 78, and these are presented consecutively to the conveyor-distributor outlet in rows of eight.

The supports return to the cutter by passing under the conveyor-distributor. A device must be provided under the conveyor chassis to allow the supports to return to the centre, or to the axis of symmetry of the conveyor, so that the supports locate themselves consecutively and ready to receive the cylinders from transfer tube 77. To this end two guides may be provided which converge towards the rear of the conveyor, elements 78b, which were used to move cams 79, coming up against the guides and being carried along.

Figure 6:
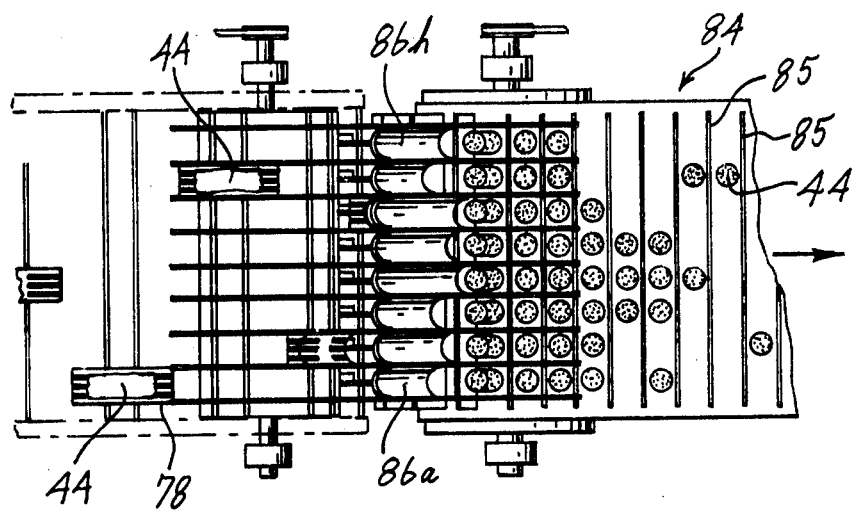
FIGS. 6 and 7 illustrate, respectively, a plan view and a side elevation of the cylinder-chute system.
Figure 7:
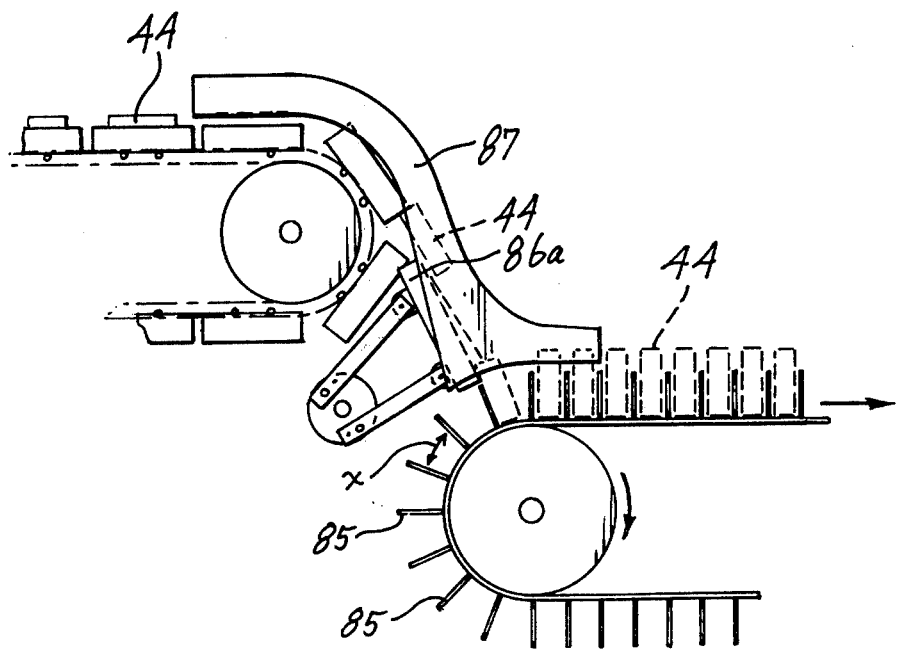

At the end of the conveyor-distributor, a chute mechanism allows the cylinders to fall and to arrange themselves vertically for seeding, as described hereinafter. The design of the chute mechanism is such as to permit vertical and transverse alignment of eight cylinders on supporting conveyor 84. This mechanism comprises nine vertical walls 87 and eight individual slides 86a to 86h (FIGS. 6 and 7) of concave semi-cylindrical shape, all inclined at a specific angle to a vertical plane passing through the outlet end of the conveyor-distributor. The lower end of each slide is thus displaced in relation to the ends of the other slides, in such a manner that eight consecutive cylinders fall at different locations in space x between two vertical separators 85 of supporting conveyor 84.

Figure 8:
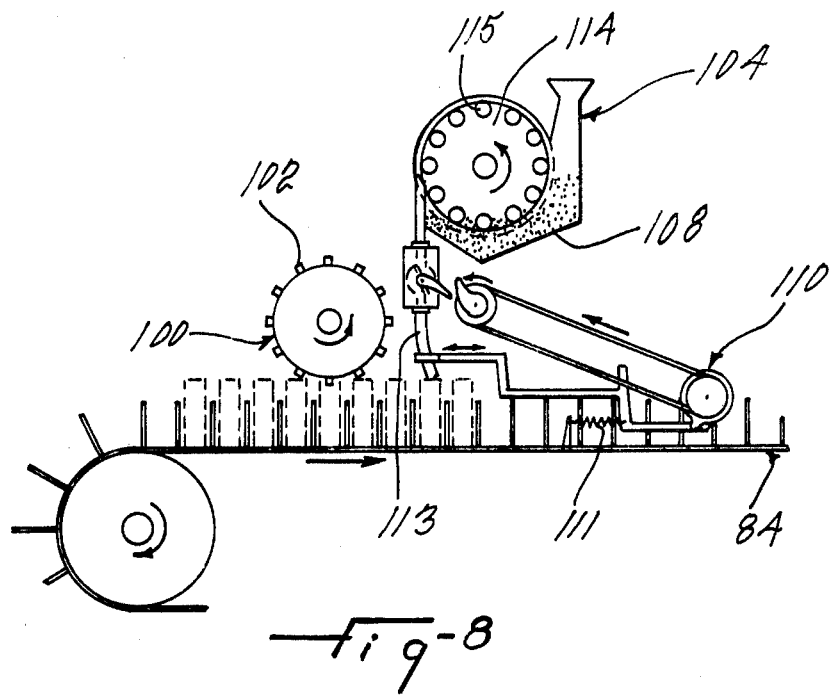
FIG. 8 shows a side elevation of the drum and the seeding system.

Located above supporting conveyor 84 is, first of all, a rotating drum 100 (FIGS. 2b, 3 and 8), the external surface of which is fitted with protuberances 102 forming cavities in the upper surfaces of the cylinders as the cylinders pass tangentially under the drum. The rotational velocity of this drum is synchronized with the velocity of the supporting conveyor, so that cavities can be punched into the cylinders. In the example illustrated, there are eight protuberances because the conveyor transports a line of eight cylinders.

A seeder 104 is also arranged above the conveyor and consists of a rotating drum 114 with peripheral tubes 115 which are perforated longitudinally. Appropriate means are provided to place these tubes alternately under suction and under pressure, so that they pick up seeds from a receptacle 108 and discharge them into the cavities produced in the upper surfaces of the cylinders. The seeds slide simultaneously into a line of eight flexible tubes 113. A stop-and-go mechanism allows these tubes to follow the movement of supporting conveyor 84. A spring 111 returns the mechanism to its starting position once the seeds have been dropped in the cavities.

Figure 9:
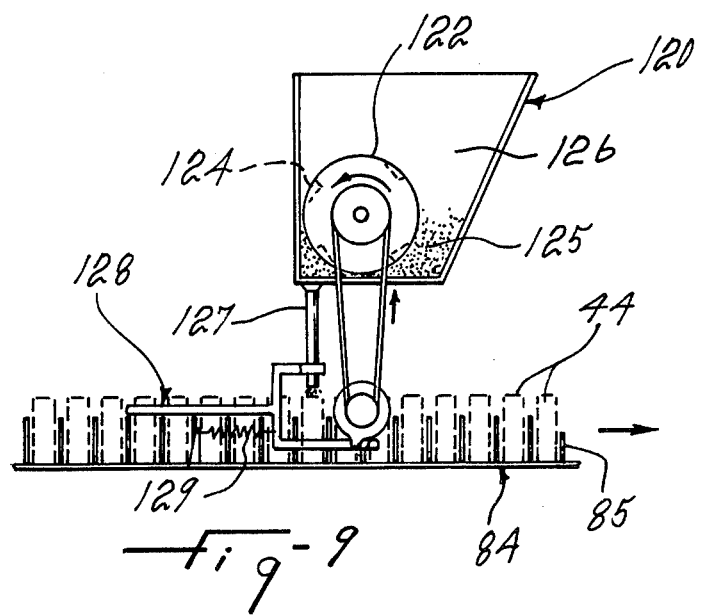
FIG. 9 is a side elevation of the sander.

Sander 120 (FIG. 9) consists of a rotating drum 122 having scoops 124 distributed uniformly around its periphery and designed to pick up sand or the like (for instance perlite) from a reservoir 126, and to place it in the cavities in the cylinders in order to provide adequate coverage for the seeds previously placed therein. The sand slides simultaneously into a line of eight cylinders through eight flexible tubes 127; a mechanism 128, similar to that described in connection with the seeder, causes the tubes to follow the movement of supporting conveyor 84. A spring 129 returns mechanism 128 to its starting position. The operation of the sander is thus synchronized with the speed of the supporting conveyor.

Finally, a device 130 packages the seeded tubes. Referring to FIG. 2b, the packaging cycle is automatically released by a position finder (not shown). A pusher 132 in the form of a comb with semi-cylindrical teeth (six in this case) facing the gaps between pairs of separators 85, moves a batch of forty-eight cylinders progressively, from the conveyor, onto a packaging plate 134, pushing them against a strip of film 136 running between two rollers 138, 140. After reaching the end of its travel, pusher 132 returns to its starting position. A gate and welding mechanism closes and welds parts 142, 144 of the film across the front of the package formed of cylinders, thus forming a closed loop which tightens the package. During this operation, means are provided to move the packaging unit along at the same speed as the supporting conveyor, as indicated by arrow 146.

The embodiments of the invention in which an exclusive property or privilege is claimed are defined as follows:

1. An apparatus for making packaged seedling tubes from a mixture of peat and water, comprising:
   (a) means for supplying peat and water to a mixer used in preparing said mixture;
   (b) forming means receiving said mixture from said mixer and producing, at its outlet, a continuous cylinder moving at a given speed,
   (c) means for covering said continuous cylinder as it emerges from said forming means; and
   (d) a rotary cutter with a spiral blade to cut the continuous covered cylinder progressively into a series of cylinders of pre-determined length; the rotational velocity of the blade being constant, in order to obtain cylinders of constant length.

2. An apparatus according to claim 1, wherein the radius of rotation of said blade varies during one revolution thereof, thereby producing progressive shearing of the covered cylinder passing tangentially in front of said cutter.

3. An apparatus according to claim 1, further comprising, downstream of said cutter, a conveyor-distributor equipped with a series of supports receiving the cut cylinders consecutively at one end; said supports moving longitudinally on said conveyor-distributor; and comprising a distributing mechanism imparting to said supports a transverse movement, so that they move in rows on said conveyor distributor; said cylinders assuming a horizontal position upon said supports.

4. An apparatus according to claim 3, wherein said conveyor-distributor consists of two parallel chains running on sprockets, said chains being united by rods arranged at right angles to the direction of travel of said cylinders, said supports being secured to each group of two rods.

5. An apparatus according to claim 4, wherein said conveyor-distributor comprises longitudinal guides in spaced relationship to each other and defining a series of parallel paths for said supports, the lower surfaces of said supports comprising a projection which actuates a pivoting cam acting as a barrier at the entry to two paths, said supports contacting said barrier being directed consecutively to one or the other of said paths for the purpose of moving them transversely.

6. An apparatus according to claim 5, wherein said conveyor-distributor comprises therebeneath means for causing each of said supports to converge consecutively towards the centreline of said conveyor-distributor.

7. An apparatus according to claim 3, comprising means for altering the position of the cutter in order to adjust the positioning of the cylinders upon said supports on said conveyor-distributor.

8. An apparatus according to claim 3, wherein the other end of said conveyor-distributor comprises a chute device causing the cylinders to fall, in vertical position, onto a supporting conveyor.

9. An apparatus according to claim 8, wherein said supporting conveyor comprises a series of vertical separators spaced longitudinally one from the other, between which the cylinders are accommodated, the number of cylinders between two separators corresponding to the number of cylinders in a transverse row upon the conveyor-distributor.

10. An apparatus according to claim 9, wherein a seeding device is mounted above the supporting conveyor for seeding the cylinders continuously.

11. An apparatus according to claim 10, wherein said seeding device comprises a rotating drum equipped, on its external cylindrical surface, with protuberances, the arrangement of which on said surface is such that said protuberances produce a cavity in the upper surface of each cylinders as it passes under said drum.

12. An apparatus according to claim 11, wherein said seeding device comprises, downstream of said drum, means for depositing seeds continuously in each of said cavities.

13. An apparatus according to claim 12, wherein said seeding device furthermore comprises, downstream of said means for depositing seeds, a sander to cover the seed with sand, and to fill the cavities, continuously.

14. An apparatus according to claim 13, wherein the movements of said drum, of said seeding device, and of said sander are synchronized with the speed at which the supporting conveyor travels.

15. An apparatus according to claim 8, comprising a continuous packaging device having a reciprocating movement controlled by the supporting conveyor, said packaging device comprising a detachable comb having teeth, the dimensions of which allow them to pass between the vertical separators, for pushing rows of tubes off the supporting conveyor onto a packaging plate.

16. An apparatus according to claim 1, comprising a delumper-sifter located upstream of said mixer.

* * * * *